United States Patent
Liu et al.

(10) Patent No.: US 11,886,786 B2
(45) Date of Patent: Jan. 30, 2024

(54) TWO-STEP X-ARCHITECTURE STEINER MINIMUM TREE CONSTRUCTION METHOD

(71) Applicant: FUZHOU UNIVERSITY, Fujian (CN)

(72) Inventors: Genggeng Liu, Fujian (CN); Wenzhong Guo, Fujian (CN); Guolong Chen, Fujian (CN)

(73) Assignee: FUZHOU UNIVERSITY

( * ) Notice: Subject to any disclaimer, the term of this patent is extended or adjusted under 35 U.S.C. 154(b) by 0 days.

(21) Appl. No.: 17/776,249

(22) PCT Filed: Dec. 8, 2020

(86) PCT No.: PCT/CN2020/134417
§ 371 (c)(1),
(2) Date: May 12, 2022

(87) PCT Pub. No.: WO2021/227463
PCT Pub. Date: Nov. 18, 2021

(65) Prior Publication Data
US 2023/0112223 A1    Apr. 13, 2023

(30) Foreign Application Priority Data

May 14, 2020   (CN) .......................... 202010410094.5

(51) Int. Cl.
*G06F 30/347*   (2020.01)
*G06F 111/06*   (2020.01)

(52) U.S. Cl.
CPC ........ *G06F 30/347* (2020.01); *G06F 2111/06* (2020.01)

(58) Field of Classification Search
CPC ............... G06F 30/347; G06F 2111/06; G06F 2119/12; G06N 3/006
See application file for complete search history.

(56) References Cited

PUBLICATIONS

X. Ma and Q. Liu, "A particle swarm optimization for steiner tree problem," 2010 Sixth International Conference on Natural Computation, Yantai, China, 2010, pp. 2561-2565, doi: 10.1109/ICNC.2010.5583217. (Year: 2010).*

(Continued)

*Primary Examiner* — Stacy Whitmore
(74) *Attorney, Agent, or Firm* — Jose Cherson Weissbrot (57) ABSTRACT

The invention relates to the technical field of computer-aided design of integrated circuits, and provides a two-step X-architecture Steiner minimum tree construction method for very large scale integration (VLSI). Based on the advantages of an X-architecture model and a particle swarm optimization technique, the method is implemented through two steps: (1) the stage of social learning discrete particle swarm search, which comprises: using an edge-vertex encoding strategy capable of maintaining optimal topological information of particles, designing a fitness function taking wirelength into consideration; and using a chaotic decreasing mutation strategy and a new social learning strategy to design a new discrete particle swarm update formula; and (2) a stage of wirelength optimization, which comprises: designing a local topological optimization strategy to minimize the wirelength of an X-architecture Steiner tree. The method guarantees short total wirelength of nets and has high stability, thus being able to construct a high-quality X-architecture Steiner minimum tree.

9 Claims, 4 Drawing Sheets

(56) References Cited

PUBLICATIONS

Sengupta, S., et al., "Particle swarm optimization: A survey of historical and recent developments with hybridization perspectives", Department of Electrical Engineering and Computer Science, Vanderbilt University, 2201 West End Ave., Nashville TN, pp. 1-34, Apr. 15, 2018. (Year: 2018).*

* cited by examiner

```
Input: XST
Output: XSMT
Begin
    // 1. Record a degree and an adjacent point list of each point in an XST
    For each terminal v_i in P of XST do
        Initialize v_i.degree = 0, v_i.adj_list[] = 0;
    End for
    For each edge (v_i, v_j) of XST do
        If v_i.degree < q
            v_i.degree += 1;
            add v_j to v_i.adj_list[];
        End if
        If v_j.degree < q
            v_j.degree += 1;
            add v_i to v_j.adj_list[];
        End if
    End for
    // 2. Sort all points in a decreasing order according to the degree, and sort elements in
    //    the adjacent point list of each point in a decreasing order according to the degree
    Sort(P) in decreasing order according to v_i.degree;
    For each terminal v_i in P of XST do
        Sort(v_i.adj_list) in decreasing order according to v_i.adj_list[k].degree, //1≤k≤v_i.degree
    End for
    // 3. Sequentially optimize local topological structures of all the points
    For each terminal v_i in P do
        For each edge (v_i, v_i.adj_list[k]) connected to v_i do
            bestChoice = getChoice(v_i, v_i.adj_list[k]); //Get the connection method of the edge (v_i, v_i.adj_list[k])
            bestFitness = getFitness(bestChoice); //Get the current fitness value
            For choice: 0 to 3 do
                If choice == bestChoice
                    Continue;
                Else
                    curFitness = getFitness(choice);
                    If bestFitness > curFitness
                        ResetChoice(v_i, v_i.adj_list[k], choice);//Update topological structures
                        bestFitness = curFitness;
                    End if
                End if
            End
        End for
    End for
End
```

FIG. 8.

TWO-STEP X-ARCHITECTURE STEINER MINIMUM TREE CONSTRUCTION METHOD

BACKGROUND OF THE INVENTION

1. Technical Field

The invention relates to the technical field of computer-aided design of integrated circuits, in particular to a two-step X-architecture Steiner minimum tree construction method for very large scale integration.

2. Description of Related Art

A Steiner minimum tree (SMT) problem is to search for a minimum-cost routing tree for connecting given pin sets by introducing extra points (Steiner points). So, the construction of an SMT is an important step of very large scale integration (VLSI) routing.

With the continuous improvement and development of the VLSI manufacturing process, the interconnection wire effect has gradually become an important factor affecting the performance of chips. However, the study of most existing routing algorithms is carried out based on the Manhattan architecture, and a routing model based on the Manhattan architecture requires that the routing directions between pins should be horizontal and vertical, which make it more difficult to optimize the length of interconnection wires in chips. Non-Manhattan architectures have more routing directions, so that routing resources may be fully used, thus improving the routing quality and chip performance.

To carry out routing based on a non-Manhattan architecture more smoothly, one key step is to construct a non-Manhattan architecture minimum tree. The X-architecture, as one of the non-Manhattan architectures, allows routing between pins to be not only horizontal and vertical, but also be 45° and 135°. Existing X-architecture Steiner minimum tree (XSMT) construction algorithms mainly include accurate algorithms and heuristic algorithms. However, with the continuously increase of the problem scale, all these algorithms either face a drastic increase of the time complexity or are prone to fall into local extremums, thus failing to provide a high-quality solution. So, an effective and practicable X-architecture Steiner minimum tree construction method is urgently needed to improve the VLSI routing quality and further optimize chip performance.

BRIEF SUMMARY OF THE INVENTION

In view of this, the objective of the invention is to provide a two-step X-architecture Steiner minimum tree construction method to construct an X-architecture Steiner tree with minimum wirelength. Under the precondition of guaranteeing low time complexity, the invention optimizes the topological structure of a routing tree by means of the powerful search capacity of a particle swarm optimization algorithm, so as to reduce redundancies of routing resources.

The invention is implemented through the following solution: a two-step X-architecture Steiner minimum tree construction method comprises the following steps:

S1: providing an X-architecture model to perform social learning discrete particle swarm search to find out a suboptimal X-architecture Steiner tree with short wirelength through a particle swarm optimization technique; and S2: performing wirelength optimization: designing a local topological optimization strategy to minimize the wirelength of the suboptimal X-architecture Steiner tree, so as to construct an X-architecture Steiner tree model with minimum wirelength, namely, an X-architecture Steiner minimum tree.

Further, definitions of the X-architecture Steiner tree model are as follows:

Definition 1. Pseudo-Steiner point: an extra connection point introduced except pins is referred to as a Pseudo-Steiner point (PS);

Definition 2. Selection 0: a Manhattan-architecture edge is drawn from a start pin node to a PS, then an X-architecture edge is drawn from the PS to a target pin node, and such a connection is referred to as selection 0;

Definition 3. Selection 1: an X-architecture edge is drawn from a start pin node to a PS, then a Manhattan-architecture edge is drawn from the PS to a target pin node, and such a connection is referred to as selection 1;

Definition 4. Selection 2: a vertical edge is drawn from a start pin node to a PS, then a horizontal edge is drawn from the PS to a target pin node, and such a connection is referred to as selection 2;

Definition 5. Selection 3: a horizontal edge is drawn from a start pin node to a PS, then a vertical edge is drawn from the PS to a target pin node, and such a connection is referred to as selection 3.

Further, S1 specifically comprises the following steps:

S11: using an edge-vertex coding strategy capable of maintaining optimal topological information of particles;

S12: designing a fitness function taking wirelength into consideration; and

S13: using a chaotic decreasing mutation strategy and a new social learning strategy to design a new discrete particle swarm update formula.

Further, S11 is specifically as follows:

The edge-vertex coding strategy uses an edge of a spanning tree and a PS selection of the edge to represent an edge of a candidate X-architecture Steiner tree; the PS selection is used to convert the edge of the spanning tree into an X-architecture edge of an X-architecture Steiner tree; each PS has four selections: selection 0, selection 1, selection 2 and selection 3; if a net to be routed comprises n pins, each candidate XST comprises (n−1) spanning tree edges, (n−1) bits of PS selections, and a numeral representing the fitness of one particle; and due to the fact that two pins of each edge of one spanning tree are represented by two numerals, the total length of each particle code is 3(n−1)+1.

Further, S12 is specifically as follows:

The length of one routing tree is the sum of lengths of all edge segments in the tree:

$$L(T_x) = \sum_{e_i \in T_x} l(e_i) \qquad (1)$$

Wherein, $l(e_i)$ represents the length of each edge segment $e_i$ in the routing tree $T_x$. Generally, the smaller the fitness of one particle, the better the particle, so the fitness function of the particles is designed as follows:

$$\text{fitness} = L(T_x) \qquad (2)$$

Further, the chaotic decreasing mutation strategy in S13 is specifically as follows:

Logistic mapping is used to generate a chaotic variable according to the following formula:

$$z_{n+1} = \mu \cdot z_n \cdot (1-z_n), n=0,1,2, \qquad (3)$$

Wherein, $z \in (0,1)$ is the chaotic variable, and an initial value of the chaotic variable is $z \neq \{0.25, 0.5, 0.75\}$, otherwise, a random sequence generated will be periodic; $\mu \in [0,4]$ is a control parameter, if $\mu=4$, the Logistic mapping will be represent as complete chaotic dynamics, and a track of the chaotic variable is dense in a whole search space, which means that a chaotic result is within a range $[0,1]$;

To ensure that a particle swarm optimization algorithm has a good global exploration capacity in an earlier stage of iteration and is able to converge rapidly in a later stage and maintain mutation randomness of the particles in the whole iteration process, a chaotically decreasing inertia weight is used:

$$w = (w_{init} - w_{end}) \cdot \frac{Maxiter - iter}{iter} + z \cdot w_{end} \quad (4)$$

Wherein, $w_{init}$ and $w_{end}$ are an initial value and an end value of the inertia weight w respectively, Maxiter and iter are a maximum iteration and a current iteration respectively, and z is the chaotic variable and follows formula (3); in this way, the inertia weight is chaotic and maintains an original variation trend.

Further, the new social learning strategy in S13 is specifically as follows:

First, all particles in a current swarm are sorted in an increasing order according to the fitness, and for each particle, particles before the particle forms an example pool of the particle; then, in each iteration, the particle randomly selects a particle from its example pool as a learning object; when the learning object selected by the particle is the first particle in the example pool, the learning object of the particle is an optimal particle in the swami; next, the particle learns historical optimal experience from the learning object to complete a corresponding social learning behavior; in this process, different particles have different social learning objects: the example pools of the same particle are not always the same in different iterations; so, the particle no longer merely learns from the optimal particle in the swarm, and any better particle in the current swarm may be the learning object of the particle. This learning process allows the particles to continuously learn from different better individuals during evolution to realize self-improvement and facilitate diversified development of the swarm, which makes it possible to explore a better XST model.

Further, the particle update formula in S13 is specifically as follows:

To enable the particle swarm optimization algorithm to better solve a discretization problem, namely to construct the XSMT, mutation and crossover operators are introduced; the particles follow the following update formula:

$$X_i^t = F_3(F_2(F_1(X_i^{t-1}, w), c_1), c_2) \quad (5)$$

Wherein, w is an inertia weight factor which determines the probability of particle mutation; $c_1$ and $c_2$ are acceleration factors which determine the probabilities of particle crossovers; $F_1$ is a mutation operation and represents the inertia component; $F_2$ and $F_3$ are crossover operations and represent the components of individual cognition and social cognition of the particles respectively; a specific update process is as follows:

The Inertia Component:

The algorithm completes velocity update of the particles through $F_1$, which is expressed as follows:

$$W_i^t = F_1(X_i^{t-1}, w) = \begin{cases} M(X_i^{t-1}), & r_1 < w \\ X_i^{t-1}, & \text{otherwise} \end{cases} \quad (6)$$

Wherein, w determines the probability of the mutation operation of the particles and follows the chaotic decreasing formula (4), and $r_1$ is a random number within $[0, 1]$.

The mutation operation is specifically as follows: a two-point mutation is adopted; if the random number generated meets $r_1 < w$, the particle swarm optimization algorithm selects two edges randomly and changes PS selections of the two edges; or, if the random number generated meets $r_1 \geq w$, the routing tree remains unchanged.

The Individual Cognition Component:

The algorithm completes individual cognition through $F_2$, which is expressed as follows:

$$S_i^t = F_2(W_i^t, c_1) = \begin{cases} C_p(W_i^t), & r_2 < c_1 \\ W_i^t, & \text{otherwise} \end{cases} \quad (7)$$

Wherein, $c_1$ determines the probability that each particle crosses with its individual historical optimum ($X_i^P$), and $r_2$ is a random number within $[0, 1]$; the individual cognition part reflects a self-experience learning process of the particles;

The Social Cognition Part:

The algorithm completes social cognition of the particles through $F_3$, which is expressed as follows:

$$X_i^t = F_3(S_i^t, c_2) = \begin{cases} C_p(S_i^t), & r_3 < c_2 \\ S_i^t, & \text{otherwise} \end{cases} \quad (8)$$

Wherein, $c_2$ determines the probability that each particle crosses with the historical optimum ($X_k^P$) of any particle in the example pool, and $r_3$ is a random number within $[0, 1]$; the social cognition component reflects information sharing and exchange between the particles;

The crossover operations in formulas (7, 8) are as follows: when the random number generated meets $r_2 < c_1$ (or $r_3 < c_2$), the crossover $F_2$ (or $F_3$) is performed, and for a Steiner tree comprising n pins: the particle swarm optimization algorithm randomly generates a continuous interval $[C_{start}, C_{end}]$ in which the crossover is to be performed, and $C_{start}$ and $C_{end}$ are random integers within $[1, n-1]$; then, a code of a learning object ($X_i^P$ or $X_k^P$) of the particle $X_i$ within an interval $[3 \times C_{start}, 3 \times C_{end}]$ is found; finally, the numeral of the $X_i$ within the interval is replaced by the code of the learning object in the interval; through the crossovers, the particle $X_i$ is able to learn part of genes from better particles and approaches a global optimal position gradually by repeated iterative learning; and it is set that the acceleration factor $c_1$ adopts a linearly decreasing strategy and $c_2$ adopts a linearly increasing strategy.

Further, S2 is specifically as follows: at most q adjacent edges of each pin are traversed through the local topological optimization strategy and are properly adjusted, wherein $1 \leq q \leq Q$, and Q is a maximum degree of pins in the net; meanwhile, the parameter q is adjusted to obtain a better optimization effect or a shorter runtime; the closer q is to Q, the better the optimization effect will be; each pin is endowed with two attributes, one attribute is the degree degree of the pin, which represents the number of adjacent points of the pin, and the other attribute is an adjacent point list adj_list[ ] of the pin, which is used to store the adjacent points; a specific implementation process of this stage is as follows:

SA: recording the degree and the adjacent point list of each point in the XST, and for a point with the degree greater than q, only q adjacent points of this point are recorded;

SB: setting a local topological optimization sequence as follows: from pins with large degrees to pins with small degrees; sorting all the pins in a decreasing order according to the degree, and sorting the adjacent points of each pin in a decreasing order according to the degree, so that topological structures in a dense region are optimized first and then topological structures in a sparse region are optimized;

SC: sequentially optimizing local topological structures of all the points, adjusting PS selections of edges between the pins and the adjacent points, trying to use the other three selections, except the current selection, for connection, and reserving the connection with the minimum fitness; continuously adjusting the PS selections of the q adjacent edges of the pins in the XST to obtain a local optimal structure in a current XST topology; and finally, constructing the X-architecture Steiner tree with the minimum wirelength.

Compared with the prior art, the invention has the following beneficial effects:

(1) The invention eventually constructs an X-architecture Steiner tree with the minimum wirelength by means of the powerful search capacity of the particle swarm optimization algorithm and the optimization of local topological structures, thus reducing redundancies of routing resources.

(2) The invention not only guarantees minimum wirelength of nets, but also has extremely good stability, thus constructing a high-quality X-architecture Steiner minimum tree.

BRIEF DESCRIPTION OF THE SEVERAL VIEWS OF THE DRAWINGS

FIG. 1 is a diagram of an X-architecture model according to one embodiment of the invention, wherein FIG. 1(a) illustrates a segment L, FIG. 1(b) illustrates selection 0, FIG. 1(c) illustrates selection 1, FIG. 1(d) illustrates selection 2, and FIG. 1(e) illustrates selection 3.

FIG. 2 is a schematic diagram of an XSMT according to one embodiment of the invention, wherein FIG. 2(a) illustrates the distribution of pins of a net to be routed, and FIG. 2(b) illustrates a corresponding topological diagram of the XSMT.

DETAILED DESCRIPTION OF THE INVENTION

The invention will be further explained below in conjunction with the accompanying drawings and embodiments.

It should be pointed out that the following detailed description is merely illustrative and is intended to further explain the invention. Unless otherwise stated, all technical and scientific terms used in this specification have meanings commonly understood by those ordinarily skilled in the art.

It should be noted that terms used in this specification are merely for describing specific embodiments, and are not intended to limit illustrative embodiments of the application. For example, unless otherwise expressly stated in the context, the singular form used here is also intended to include the plural form. In addition, it should be understood that the terms "include" and/or "comprise" in this specification indicate the presence of a feature, step, operation, device, assembly and/or a combination thereof.

This embodiment provides a two-step X-architecture Steiner minimum tree construction method, comprising the following steps:

S1: an X-architecture model is provided to perform social learning discrete particle swarm search to find out a suboptimal X-architecture Steiner tree with short wirelength through a particle swarm optimization technique; and S2: wirelength optimization is performed: design a local topological optimization strategy is designed to minimize the wirelength of the suboptimal X-architecture Steiner tree so as to construct an X-architecture Steiner tree model with minimum wirelength, namely, an X-architecture Steiner minimum tree.

Wherein, a degree and an adjacent point list of all pins are taken into consideration to fulfill the purpose of optimizing topological structures from a dense region to a sparse region.

In this embodiment, definitions of the X-architecture Steiner tree model are as follows:

Definition 1. Pseudo-Steiner point: an extra connection point introduced except pins is referred to as a Pseudo-Steiner point (PS);

Definition 2. Selection 0: a Manhattan-architecture edge is drawn from a start pin node to a PS, then an X-architecture edge is drawn from the PS to a target pin node, and such a connection is referred to as selection 0;

Definition 3. Selection 1: an X-architecture edge is drawn from a start pin node to a PS, then a Manhattan-architecture edge is drawn from the PS to a target pin node, and such a connection is referred to as selection 1;

Definition 4. Selection 2: a vertical edge is drawn from a start pin node to a PS, then a horizontal edge is drawn from the PS to a target pin node, and such a connection is referred to as selection 2;

Definition 5. Selection 3: a horizontal edge is drawn from a start pin node to a PS, then a vertical edge is drawn from the PS to a target pin node, and such a connection is referred to as selection 3.

In this embodiment, S1 specifically comprises the following steps:

S11: an edge-vertex encoding strategy capable of maintaining optimal topological information of particles is used;

S12: a fitness function taking wirelength into consideration is designed; and

S13: a chaotic decreasing mutation strategy and a new social learning strategy are used to design a new discrete particle swarm update formula.

In this embodiment, S11 is specifically as follows:

XSMT construction is a discretization problem, so an effective coding strategy may effectively improve algorithm performance and search efficiency. Compared with traditional Prüfer encoding, the edge-vertex encoding strategy is able to maintain optimal topological information of particles in iteration and allows the coding length to be decreased by about two thirds, thus being more suitable for an evolutionary algorithm such as the particle swarm optimization algorithm.

The edge-vertex encoding strategy uses an edge of a spanning tree and a PS selection of the edge to represent an edge of a candidate X-architecture Steiner tree; the PS selection is used to convert the edge of the spanning tree into an X-architecture edge of an X-architecture Steiner tree; each PS has four selections: selection 0, selection 1, selection 2 and selection 3; if a net to be routed comprises n pins, each candidate XST comprises (n−1) spanning tree edges, (n−1) bits of PS selections, and a numeral representing the fitness of one particle; and due to the fact that two pins of each edge of one spanning tree are represented by two numerals, a total length of each particle code is 3(n−1)+1. For example, a candidate XST (n=8) may be represented by a numeric string: 7 6 0 6 4 1 7 5 1 5 1 2 1 3 0 1 8 1 5 2 2 10.01. Wherein, the last numeral 10.01 represents the fitness of the particle, and each italic numeral represents the corresponding PS selection of each edge. The first numeric sub-string (760) represents one edge of the Steiner tree, and the two pins of the edge are represented by 7 and 6 respectively, and the PS selection is selection 0.

In this embodiment, S12 is specifically as follows:
The length of one routing tree is the sum of lengths of all edge segments in the tree:

$$L(T_x) = \sum_{e_i \in T_x} l(e_i) \qquad (1)$$

Wherein, $l(e_i)$ represents the length of each edge segment $e_i$ in the routing tree $T_x$. Generally, the smaller the fitness of one particle, the better the particle, so the fitness function of the particles is designed as follows:

fitness=$L(T_x)$ (2),

To calculate the length of the X-architecture Steiner tree, all edge segments are classified into four types: horizontal edge segments, vertical edge segments, 45° edge segments, and 135° edge segments. The specific calculation process is as follows: (1) the 45° edge segments are clockwise rotated into horizontal edges, and the 135° edge segments are clockwise rotated into vertical edges; (2) the horizontal edges are arrayed from bottom to top and then from left to right according to coordinates of the pins at left ends of the edge segments; and (3) the vertical edges are arrayed from left to right and then from bottom to top according to coordinates of the pins at lower ends of the edge segments. The wirelength of the X-architecture Steiner tree is the sum of the lengths of these edge segments (not including overlapped parts).

In this embodiment, the chaotic decreasing mutation strategy in S13 is specifically as follows:
The inertia weight, as an important parameter of the particle swarm optimization algorithm, has a direct influence on the convergence precision of the algorithm. Traditional particle swarm optimization techniques regard the inertia weight as a constant, which leads to a poor global exploration capacity of the algorithm. To solve this problem, the invention designs a chaotically decreasing inertia weight and a mutation operator to implement discretization in this part.

Chaotic search, as a pseudo-random, ergodic, and regular random motion, is insensitive to its initial value and high in calculation precision. In this embodiment, logistic mapping is used to generate a chaotic variable according to the following formula:

$$z_{n+1} = \mu \cdot z_n \cdot (1-z_n), n=0,1,2, \qquad (3)$$

Wherein, $z \in (0,1)$ is the chaotic variable, and an initial value of the chaotic variable is $z_0 \neq \{0.25, 0.5, 0.75\}$, otherwise, a random sequence generated will be periodic; $\mu \in [0,4]$ is a control parameter, if $\mu=4$, the logistic mapping will be represent as complete chaotic dynamics, and a track of the chaotic variable is dense in a whole search space, which means that a chaotic result is within a range [0,1];

To ensure that a particle swarm optimization algorithm has a good global exploration capacity in an earlier stage of iteration and is able to converge rapidly in a later stage and maintain mutation randomness of the particles in the whole iteration process (see the description below for the specific mutation process), a chaotically decreasing inertia weight is used:

$$w = (w_{init} - w_{end}) \cdot \frac{Maxiter - iter}{iter} + z \cdot w_{end} \qquad (4)$$

Wherein, $w_{init}$ and $w_{end}$ are an initial value and an end value of the inertia weight w respectively, Maxiter and iter are a maximum iteration and a current iteration respectively, and z is the chaotic variable and follows formula (3); in this way, the inertia weight is chaotic and maintains an original variation trend.

In this embodiment, the new social learning strategy in S13 is as follows:
Social learning plays an important role in learning behaviors of swarm intelligence and allows individuals in a swarm to learn a behavior from other individuals without the cost of increasing self-tests and errors. The invention puts forwards a social learning discrete particle swarm optimization algorithm based on a new social learning strategy to better construct the X-architecture Steiner minimum tree.

A social learning mode adopted by traditional particle swarm optimization algorithms is to learn from an optimal particle in a current swarm in each iteration. The invention changes this simplex learning mode by introducing example pools. First, all particles in the current swarm are sorted in an increasing order according to the fitness, and for each particle, particles before the particle forms an example pool of the particle; then, in each iteration, the particle randomly selects a particle from its current example pool as a learning object; when the learning object selected by the particle is the first particle in the example pool, the learning object of the particle is an optimal particle in the swarm; next, the particle learns historical optimal experience from the learning object to complete a corresponding social learning behavior; in this process, different particles have different learning objects; the example pools of the same particle are not always the same in different iterations; so, the particle no longer merely learns from the optimal particle in the swarm, and any better particle in the current swarm may be the learning object of the particle. This learning process allows the particles to continuously learn from different better individuals during evolution to realize self-improvement and facilitate diversified development of the swarm, which makes it possible to explore a better XST model.

Figure 4:
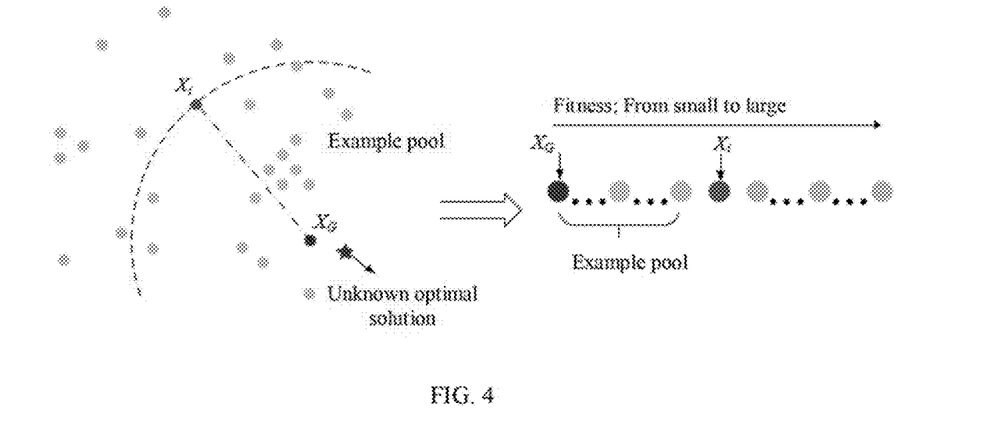
FIG. 4 is a diagram of an example pool of particles according to one embodiment of the invention.

FIG. 4 illustrates an example pool for particle learning. The pentagram is an unknown optimal solution to be explored, the particle $X_G$ is an optimal solution found for the current swarm. For the particle $X_i$, particles located outside the circle using a position $X_G$ as the center and the distance between $X_i$ and $X_G$ as a radius are relatively backward particles, and particles located in this circle are closer to the global optimal solution than $X_i$, have a fitness better than that of $X_i$, and form an example pool of $X_i$ (together with the global optimal solution $X_G$), and each of these particles may be the social learning object of the particle $X_i$. In each iteration, the particle $X_i$ selects any one particle from the example pool and learns historical experience from this particle (a historical optimum of this particle) to complete the social learning process.

In this embodiment, the particle update formula in S13 is specifically as follows:

To enable the particle swarm optimization algorithm to better solve a discretization problem, namely to construct the XSMT, mutation and crossover operators are introduced; the particles follow the following update formula:

$$X_i^t = F_3(F_2(F_1(X_i^{t-1},w),c_1),c_2) \quad (5)$$

Wherein, w is an inertia weight factor which determines the probability of particle mutation; $c_1$ and $c_2$ are acceleration factors which determine the probabilities of particle crossovers; $F_1$ is a mutation operation and represents an inertia component; $F_2$ and $F_3$ are crossover operations and represent the components of individual cognition and social cognition of the particles respectively; a specific update process is as follows:

The Inertia Component:

The algorithm completes velocity update of the particles through $F_1$, which is expressed as follows:

$$W_i^t = F_1(X_i^{t-1}, w) = \begin{cases} M(X_i^{t-1}), & r_1 < w \\ X_i^{t-1}, & \text{otherwise} \end{cases} \quad (6)$$

Figure 5:
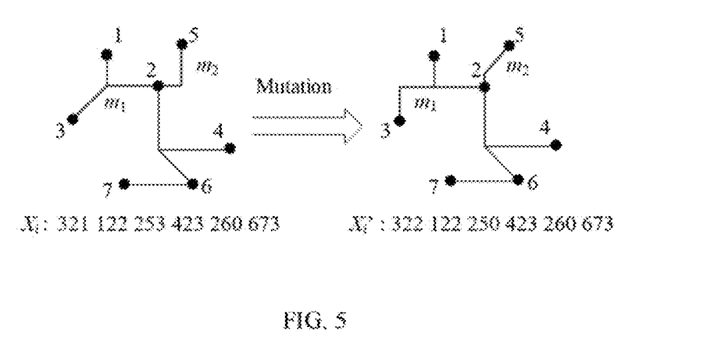
FIG. 5 is a diagram of a mutation operation of particles according to one embodiment of the invention.

Wherein, w determines the probability of the mutation operation of the particles and follows the chaotic decreasing formula (4), and $r_1$ is a random number within [0, 1];

The mutation operation is specifically as follows: a two-point mutation is adopted; if the random number generated meets $r_1 < w$, the particle swarm optimization algorithm selects two edges randomly and changes PS selections of the two edges; or, if the random number generated meets $r_1 \geq w$, the routing tree remains unchanged. FIG. 5 illustrates a schematic diagram of the mutation of a routing tree comprising 6 pins, and codes of the particles are given below the routing tree (the fitness of the particles is not shown). As can be seen from FIG. 5, the algorithm randomly selects two edges $m_1$ (3,2,1) and $m_2$ (2,5,3) of the particle $X_i$: 321 122 253 423 260 673, and routing modes of $m_1$ and $m_2$ are changed into selection 2 and selection 0 from selection 1 and selection 3 through $F_1$.

The Individual Cognition Component:

The algorithm completes individual cognition through $F_2$, which is expressed as follows:

$$S_i^t = F_2(W_i^t, c_1) = \begin{cases} C_p(W_i^t), & r_2 < c_1 \\ W_i^t, & \text{otherwise} \end{cases} \quad (7)$$

Wherein, $c_1$ determines the probability that each particle crosses with it individual historical optimum ($X_i^P$), and $r_2$ is a random number within [0, 1]; the individual cognition component reflects a self-experience learning process of the particles;

The Social Cognition Component:

The algorithm completes social cognition of the particles through $F_3$, which is expressed as follows:

$$X_i^t = F_3(S_i^t, c_2) = \begin{cases} C_p(S_i^t), & r_3 < c_2 \\ S_i^t, & \text{otherwise} \end{cases} \quad (8)$$

Figure 6:
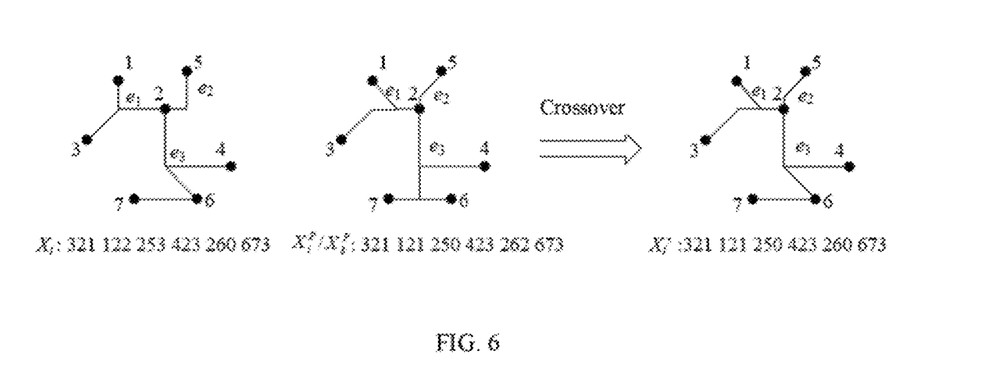
FIG. 6 is a diagram of crossover operations of particles according to one embodiment of the invention.

Wherein, $c_2$ determines the probability that each particle crosses with the historical optimum ($X_k^P$) of any particle in the example pool, and $r_i$ is a random number within [0, 1]; the social cognition component reflects information sharing and exchange between the particles;

The crossovers in formulas (7, 8) are as follows: when the random number generated meets $r_2 < c_1$ (or $r_3 < c_2$), the crossover $F_2$ (or $F_3$) is performed, and for a Steiner tree comprising n pins: the particle swarm optimization algorithm randomly generates a continuous interval $[C_{start}, C_{end}]$ in which the crossover is to be performed, and $C_{start}$ and $C_{end}$ are random integers within [1, n−1]; then, a code of a learning object ($X_i^P$ or $X_k^P$) of the particle $X_i$ within an interval $[3 \times C_{start}, 3 \times C_{end}]$ is found; finally, the numeral of the $X_i$ within the interval is replaced by the code of the learning object in the interval; as shown in FIG. 6, $X_i$ $X_i$ (321 122 253 423 260 673) is a particle to be crossed, and the particle (321 121 250 423 262 673) is the learning object of the particle $X_i$, is represented as an individual historical optimal particle in formula (7) and is represented as any one historical optimal plan in the example pool. The algorithm generates a continuous interval $[C_{start}, C_{end}] = [2, 4]$ first, and corresponding edges to be crossed are $e_1$, $e_2$, and $e_3$; next, the code 121 250 423 of the learning object of $X_i$ within the interval $[3 \times (2-1), 3 \times 4] = [3,12]$ is found; and finally, the code of the particle X, within the interval is replaced with the code 121 250 423. After the crossover is completed, routing modes of the edges $e_1$, $e_2$, and $e_3$ in $X_i$ are changed into selection 1, selection 0 and selection 3 from selection 2, selection 3 and selection 3, and PS selections of the other edges remain unchanged.

Through the crossover, the particle X, is able to learn part of genes from better particles and approaches a global optimal position gradually by repeated iterative learning; and it is set that the acceleration factor $c_1$ adopts a linear decreasing strategy and the acceleration factor $c_2$ adopts a linear increasing strategy, so that the particle swarm optimization algorithm is quite likely to learn historical experience of itself in the earlier stage of iteration to enhance the global exploration capacity and is quite likely to learn historical experience of better particles in the later stage of iteration to enhance the local exploitation capacity, so that the particle may be rapidly converged to a global optimal position.

Figure 8:
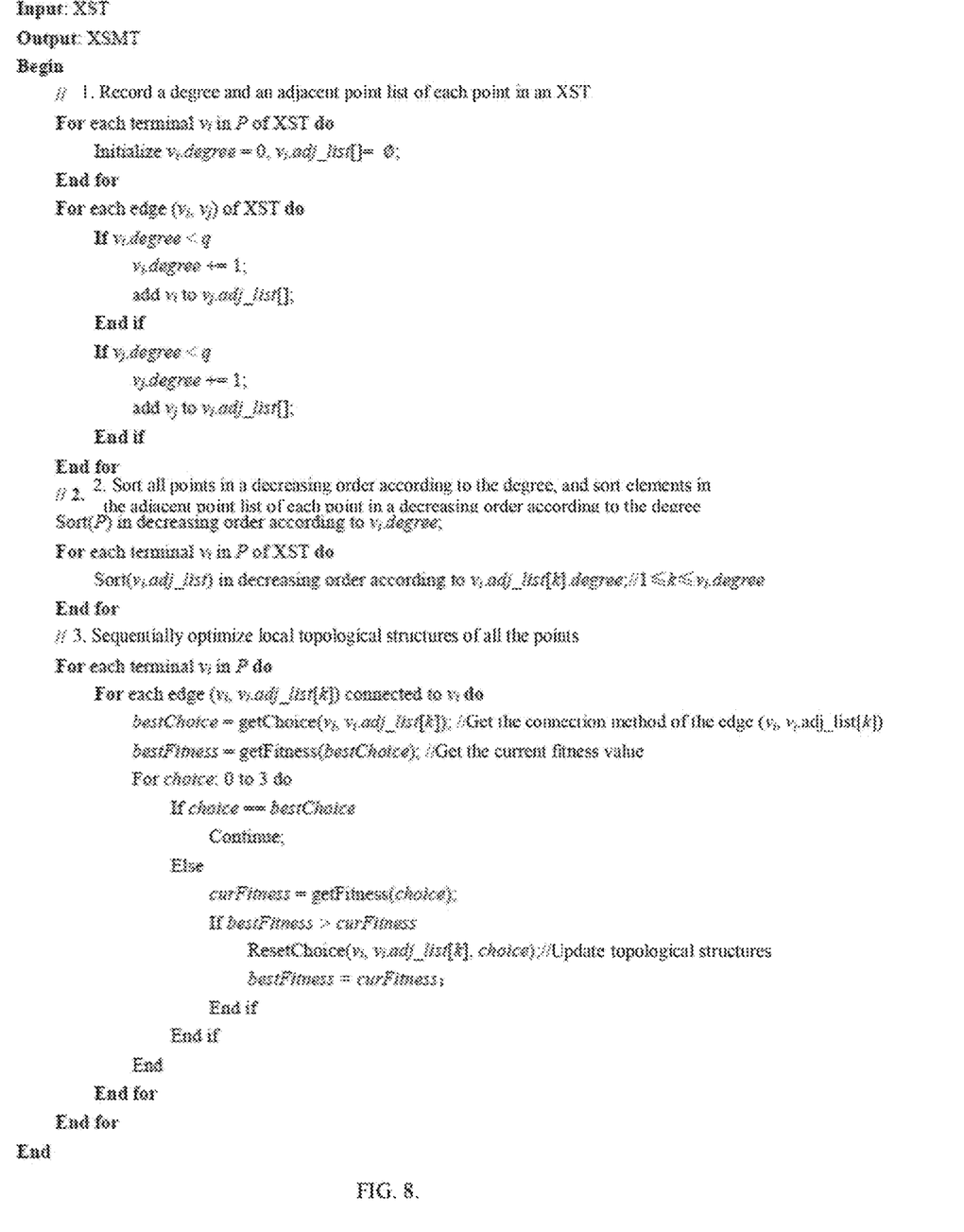
FIG. 8 is a diagram of pseudo-codes of a local topological optimization strategy according to one embodiment of the invention.

In this embodiment, S2 is specifically as follows:

Considering that in a local topology based on an X-architecture, the relative positions of adjacent points of 2-degree pins and the relative positions of the adjacent points respect to the PS determine whether an optimal connection of the pins is a Manhattan architecture or a X-architecture; different positions of the pins will naturally generate a different topological structure, so the local topological optimization strategy is designed to further optimize the X-architecture Steiner tree obtained in the first stage; and considering the complexity of an actual net structure, not all the adjacent edges of the pins are adjusted in the invention, which may otherwise take a large amount of time and cost. Thus, at most y adjacent edges of each pin are traversed through the local topological optimization strategy and are properly adjusted, wherein $1 \leq q \leq Q$, and Q is a maximum degree of pins in the net; meanwhile, the parameter q is adjusted to obtain a better optimization effect or a shorter runtime; the closer q is to Q, the better the optimization effect will be; and pseudo-codes of the local topological optimization strategy are shown in FIG. 8. Each pin is endowed with two attributes, one attribute is the degree degree of the pin, which represents the number of adjacent points of the pin, and the other attribute is an adjacent point list adj_list[ ] of the pin, which is used to store the adjacent points; a specific implementation process of this stage is as follows:

SA: the degree and the adjacent point list of each point in the XST are recorded, and for a point with the degree greater than q, only q adjacent points of this point are recorded;

SB: a local topological optimization sequence is set as follows: from pins with large degrees to pins with small degrees; all the pins are sorted in a decreasing order according to the degree, and the adjacent points of each pin are sorted in a decreasing order according to the degree, so that topological structures in a dense region are optimized first and then topological structures in a sparse region are optimized;

SC: local topological structures of all the points are optimized sequentially, selections of edges between the pins and the adjacent points are adjusted, the other three selections, except the current selection, are used for connection, and the connection with the minimum fitness is reserved; the PS selections of the y adjacent edges of the pins in the XST are adjusted continuously to obtain a local optimal structure in a current XST topology; and finally, the X-architecture Steiner tree with the minimum wirelength is constructed.

Figure 1:
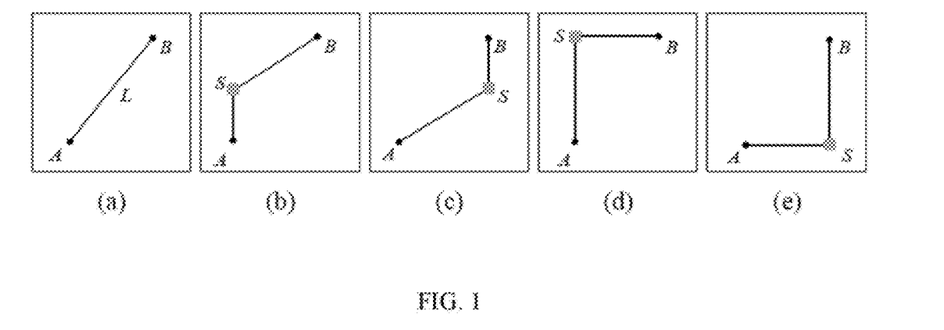

Preferably, in this embodiment, 1. X-architecture model:

The X-architecture, as one of the non-Manhattan architectures, allows routing between pins to be not only horizontal and vertical, but also be 45° and 135°. The invention uses the X-architecture to construct a routing model of the Steiner minimum tree, and definitions of the routing model are as follows:

Definition 1. Pseudo-Steiner point: an extra connection point introduced except pins is referred to as a Pseudo-Steiner point (PS);

Definition 2. Selection 0: a Manhattan-architecture edge is drawn from a start pin node to a PS, then an X-architecture edge is drawn from the PS to a target pin node, and such a connection is referred to as selection 0. FIG. 1 illustrates an edge L connecting a pin A and a pin B. The corresponding PS selection of the edge L is shown in FIG. 1(b).

Definition 3. Selection 1: an X-architecture edge is drawn from a start pin node to a PS, then a Manhattan-architecture edge is drawn from the PS to a target pin node, and such a connection is referred to as selection 1, as shown in FIG. 1(c).

Definition 4. Selection 2: a vertical edge is drawn from a start pin node to a PS, then a horizontal edge is drawn from the PS to a target pin node, and such a connection is referred to as selection 2, as shown in FIG. 1(d).

Definition 5. Selection 3: a horizontal edge is drawn from a start pin node to a PS, then a vertical edge is drawn from the PS to a target pin node, and such a connection is referred to as selection 3, as shown in FIG. 1(e).

Figure 2:
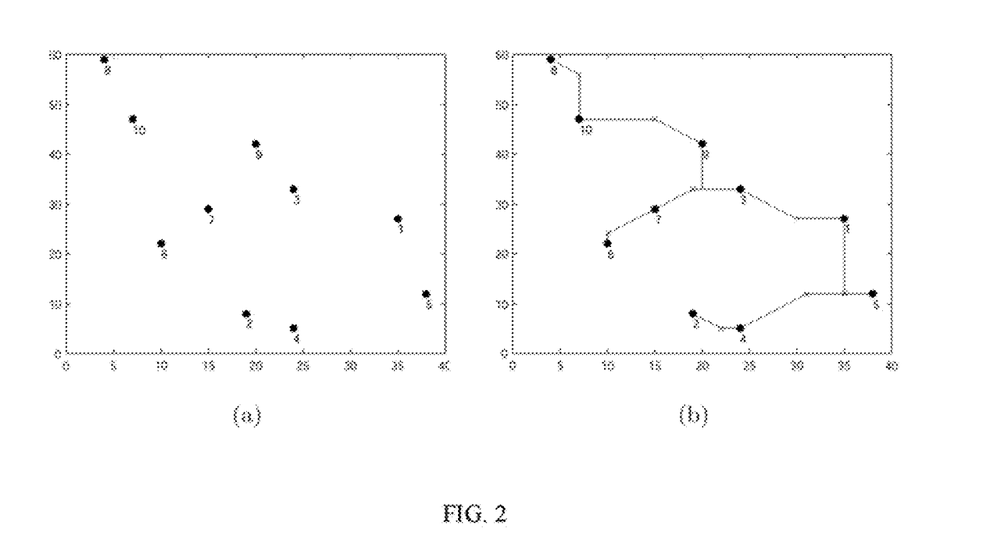

2. X-Architecture Steiner Minimum Tree:

The X-architecture Steiner minimum tree is the optimal connection model for multi-end nets during VLSI routing. The XSMT problem is described as follows: a pin set $P=\{P_1, P_2, \ldots, P_n\}$ includes n pins of a net to be routed is given, and each pin $P_i(1 \le i \le n)$ corresponds to a coordinate pair $(x_i, y_i)$. All the pins in the set P are connected by routing according to the X-architecture, wherein PS selections include the four selections given by definitions 2-5, so that an XSMT is constructed. As shown in FIG. 1, FIG. 2(a) illustrates the distribution of pins of the net to be routed, and the topological diagram of the corresponding XSMT is shown in FIG. 2(b).

3. Construction Objective of the X-Architecture Steiner Minimum Tree:

The problem of X-architecture Steiner minimum tree construction taking the wirelength into consideration is to construct an X-architecture Steiner tree with minimum wirelength by connecting all pins through four PS selections. So, the total wirelength of the routing tree is an important indicator for evaluating the quality of a routing result, and has a direct influence on chip performance. Meanwhile, the invention adopts a heuristic algorithm based on swarm intelligence, a solution generated by the invention is not unique, which means that the method should be highly stable, so that a good solution can be obtained in multiple experiments. Thus, the ultimate objective of the invention is to minimize the total wirelength of the routing tree to construct the X-architecture Steiner minimum tree and ensure that the construction method has good stability.

Figure 3:
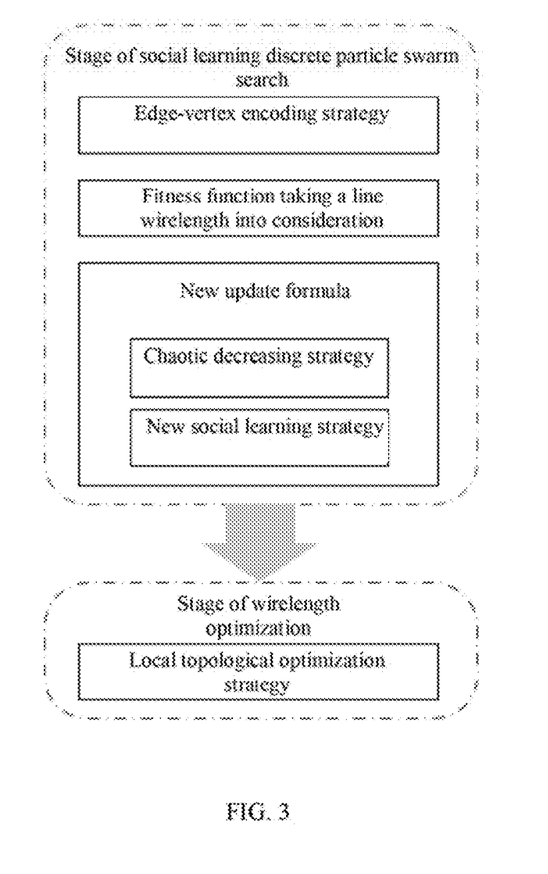
FIG. 3 is a flow diagram of one embodiment of the invention.

4. Summary of the Method:

The two-step X-architecture Steiner minimum tree construction method optimizes the total wirelength of nets and specifically comprises a stage of social learning discrete particle swarm search and a stage of wirelength optimization stage, as shown in FIG. 3.

In the first stage, a new particle swarm optimization technique is adopted, which mainly comprises: designing an edge-vertex encoding strategy capable of maintaining optimal topological information of particles; designing a fitness function taking wirelength into consideration; using a chaotic decreasing mutation strategy and a new social learning strategy; and providing a new social discrete particle swarm search algorithm integrating mutation and crossover operators, so that an X-architecture Steiner minimum tree can be better constructed. In this stage, a suboptimal solution is searched out through the particle swarm optimization technique, so that compared with a common heuristic algorithm, a Steiner tree with a shorter wirelength can be obtained. In the second stage, the suboptimal solution obtained in the first stage is further optimized, and specifically, the wirelength of the X-architecture Steiner tree is minimized by optimizing local topologies of the pins. Specific implementations of each strategy and each stage are described in detail below respectively.

Preferably, this embodiment mainly comprises two stages:

First stage (social learning discrete particle swarm search):

In this embodiment, the first stage aims to search out a suboptimal X-architecture Steiner tree with short wirelength through a particle swarm optimization technique. This stage comprises three key technical designs: (1) an edge-vertex encoding strategy capable of maintaining optimal topological information of particles; (2) a fitness function taking the wirelength into consideration; and (3) a new discrete particle update formula, including a chaotic decreasing mutation strategy and a new social learning strategy. The social learning discrete particle swarm optimization algorithm designed by the invention allows each particle not only to learn self-experience, but also to learn the historical experience from any one better particle in a current swarm. Meanwhile, the chaotically decreasing weight ratio improves the diversity in the population evaluation process and improves the exploration capacity of the algorithm, thus breaking through local extremums. In addition, the particle $X_k$ in the example pool has a fitness better than that of particle $X_i$, so the particle does not learn from $X_k$ and directly learns the historical optimum of particle $X_k$, so that the exploitation capacity of the algorithm is improved, and the convergence of the algorithm is accelerated. The specific implementation of this stage is as follows:

(1) A swarm and all parameters are initialized. The particle swarm optimization algorithm generates a minimum spanning tree to construct an initial routing tree and randomly initializes the PS selection of each edge to selection 0 or selection 1.

(2) The fitness of each particle is calculated according to formula (2), and the particles are sorted according to the fitness: $S=\{X_1, \ldots, X_{i-1}, X_i, X_{i+1}, \ldots, X_M\}$.

(3) A historical optimal solution of each particle is initialized to themselves, a population optimal solution is initialized to the first particle, and a sample of each particle is $EP=\{X_1, \ldots, X_{i-1}\}$.

(4) The velocity and position of each particle are updated according to formulas (5-8), wherein w adopts a chaotic decreasing strategy (formula (4)), and $c_1$ and $c_2$ adopt a linear decreasing strategy and a linear decreasing strategy respectively.

(5) The fitness of each particle is calculated.

(7) The individual historical optimal solution, the example pool of each particle, and the population optimal solution are updated.

(8) If an end condition is met (a set maximum number of iterations is reached), the algorithm is ended; otherwise, Step 4 is performed again.

In this embodiment, because the Manhattan routing modes (selection 2 and selection 3) limit the wirelength optimization capacity and the 45°-routing mode and the 135°-routing mode can make full use of limited routing resources, when routing selections of edges are initialized, the routing selections are directly randomly initialized to selection 0 and selection 1 rather than being randomly initialized to selection 2 and selection 3. Thus, to some extent, by initializing the edges of a routing tree to selection 0 and selection 1, high-quality initial particles may be generated, and the particle swarm optimization algorithm may be accelerated to search out an optimal plan.

Although the particle swarm optimization algorithm is a random algorithm, the social learning discrete particle swarm optimization algorithm used in this stage has good stability for the following two reasons: first, the values of inertia weight may regularly distributed in a linearly decreasing region by means of the pseudo-randomness, ergodicity, and insensitivity to initial values of chaotic search and may be decreased gradually with the increase of the number of iterations under the precondition of a relatively stable mutation probability; second, traditional particle swarm optimization technique carries out social learning by learning from an optimal particle in a swarm, so a great position fluctuation will be generated every backward particle, a large distance away from the optimal particle in the swarm, is iterated, which makes the stability of the algorithm unsatisfying; in the invention, social learning of the particles is implemented based on the example pool, so that the range of learning objects is expanded, the problem of jump is solved to some extent, thus improving the stability of the algorithm.

Second Stage (Wirelength Optimization):

In this embodiment, the second stage aims to perform more accurate topological optimization on the suboptimal X-architecture Steiner tree searched out through the particle swarm optimization technique so as to obtain a final XSMT.

Although the particle swarm optimization technique can search out a satisfying solution to a large-scale discretization problem within a limited time, in most cases, there is still a definite difference between the satisfying solution and an unknown optimal solution. In addition, the introduction of the X-architecture decreases the total wirelength of the Steiner tree to some extent, and it is not in all cases that the routing mode of the X-architecture is superior to that of the Manhattan structure.

Figure 7:
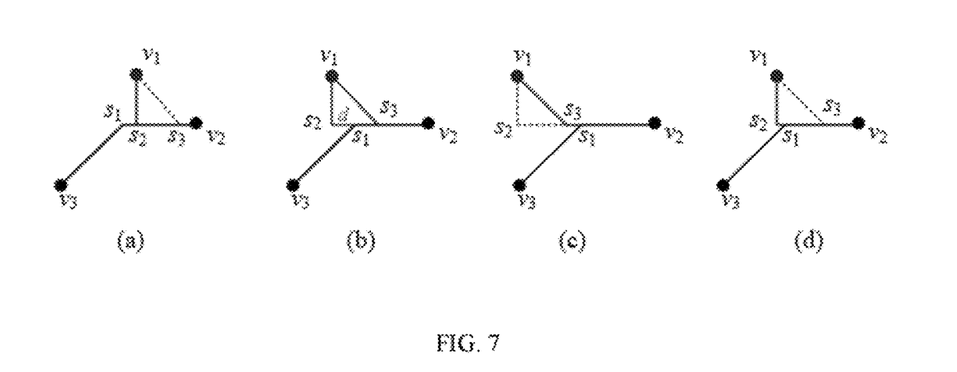
FIG. 7 is a local optimal topological diagram of 2-degree pins under an X-structure according to one embodiment of the invention.

FIG. 7 illustrates local topologies of 2-degree pins in X-architecture, wherein $v_2$ is a 2-degree pin which is connected to a pin $v_1$ and a pin $v_3$ (wherein, $s_2$ and $s_3$ are PSs formed when $v_2$ is connected to $v_1$ through a Manhattan architecture and an X-architecture respectively). On the basis of an existing topological structure $(v_2, v_3, s_1)$ (wherein, $s_1$ is a PS for connecting $v_2$ and $v_3$), the invention takes into consideration the connection of $v_2$ and $v_1$, to enable the 2-degree pin to have an optimal topological structure. Main cases are as follows:

When $s_2$ is located on the right of $s_1$ (FIG. 7(a)): if $v_2$ is connected to $v_1$ through selection 3, extra wirelength is $e(s_2, v_1)$; if $v_2$ is connected to $v_1$ through selection 0, extra wirelength is $e(s_3, v_1)$; obviously, $(v_2, v_1, s_2)$ is an optimal structure because the Manhattan edge $e(s_2, v_1)$ is always less than the hypotenuse $e(s_3, v_1)$.

When $s_2$ is located on the left of $s_1$ (FIG. 7(b), FIG. 7(c), and FIG. 7(c)): in FIG. 7(b), $e(s_1, s_2)=d$, so $e(s_1, s_2)+e(s_2, v_1)=e(s_3, v_1)$; n this case, based on the given topological structure, the total wirelength obtained by the two connections $(v_2, v_1, s_2)$ and $(v_2, v_1, s_3)$ are the same. When $e(s_1, s_2)>d$ (FIG. 7(c)), $e(s_1, s_3)+(e(s_1, s_2)+e(s_2, v_1))>e(s_1, s_3)+e(s_3, v_1)$, so $v_2$ is connected to $v_1$ through selection 0, and $(v_2, v_1, s_3)$ is the optimal structure. When $e(s_1, s_2)<d$ (FIG. 7(d)), the routing mode based on the Manhattan architecture may obtain shorter wirelength, that is, $(v_2, v_1, s_2)$ is the optimal structure.

The above embodiments are merely preferred ones of the invention, and all equivalent variations and modifications made according to the patent scope of the application of invention should fall within the scope of the invention.

What is claimed is:

1. A two-step X-architecture Steiner minimum tree construction method, comprising the following steps:
   S1: providing an X-architecture model to perform social learning discrete particle swarm search to find out a suboptimal X-architecture Steiner tree with a short wirelength through a particle swarm optimization technique; and
   S2: performing wirelength optimization: designing a local topological optimization strategy to minimize the wirelength of the suboptimal X-architecture Steiner tree so as to construct an X-architecture Steiner tree model with a minimum wirelength, namely, an X-architecture Steiner minimum tree.

2. The two-step X-architecture Steiner minimum tree construction method according to claim 1, wherein definitions of the X-architecture Steiner tree model are as follows:
   definition 1. Pseudo-Steiner point: an extra connection point introduced except pins is referred to as a Pseudo-Steiner point (PS);
   definition 2. Selection 0: a Manhattan-architecture edge is drawn from a start pin node to a PS, then an X-architecture edge is drawn from the PS to a target pin node, and such a connection is referred to as selection 0;
   definition 3. Selection 1: an X-architecture edge is drawn from a start pin node to a PS, then a Manhattan-architecture edge is drawn from the PS to a target pin node, and such a connection is referred to as selection 1;

definition 4. Selection 2: a vertical edge is drawn from a start pin node to a PS, then a horizontal edge is drawn from the PS to a target pin node, and such a connection is referred to as selection 2;

definition 5. Selection 3: a horizontal edge is drawn from a start pin node to a PS, then a vertical edge is drawn from the PS to a target pin node, and such a connection is referred to as selection 3.

3. The two-step X-architecture Steiner minimum tree construction method according to claim 2, wherein S1 specifically comprises the following steps:

S11: using an edge-vertex encoding strategy capable of maintaining optimal topological information of particles;

S12: designing a fitness function taking wirelength into consideration; and

S13: using a chaotic decreasing mutation strategy and a new social learning strategy to design a new discrete particle swarm update formula.

4. The two-step X-architecture Steiner minimum tree construction method according to claim 3, wherein S11 is specifically as follows:

the edge-vertex encoding strategy uses an edge of a spanning tree and a PS selection of the edge to represent an edge of a candidate X-architecture Steiner tree; the PS selection is used to convert the edge of the spanning tree into an X-architecture edge of an X-architecture Steiner tree; each PS has four selections: selection 0, selection 1, selection 2 and selection 3; if a net to be routed comprises n pins, each candidate XST comprises (n−1) spanning tree edges, (n−1) bits of PS selections, and a numeral representing the fitness of one particle; and due to the fact that two pins of each edge of one spanning tree are represented by two numerals, the total length of each particle code is 3(n−1)+1.

5. The two-step X-architecture Steiner minimum tree construction method according to claim 1, wherein S12 is specifically as follows:

the length of one routing tree is the sum of lengths of all edge segments in the tree:

$$L(T_x) = \sum_{e_i \in T_x} l(e_i) \qquad (1)$$

wherein, $l(e_i)$ represents the length of each edge segment $e_i$ in the routing tree $T_x$; generally, the smaller the fitness of one particle, the better the particle, so the fitness function of the particles is designed as follows:

fitness=$L(T_x)$ \qquad (2)

6. The two-step X-architecture Steiner minimum tree construction method according to claim 1, wherein the chaotic decreasing mutation strategy in S13 is specifically as follows:

logistic mapping is used to generate a chaotic variable according to the following formula:

$$z_{n+1} = \mu \cdot z_n \cdot (1-z_n), n=0,1,2, \qquad (3)$$

wherein, $z \in (0,1)$ is the chaotic variable, and an initial value of the chaotic variable is $z_0 \neq \{0.25, 0.5, 0.75\}$, otherwise, a random sequence generated will be periodic; $\mu \in [0,4]$ is a control parameter, if $\mu=4$, the logistic mapping will be represent as complete chaotic dynamics, and a track of the chaotic variable is dense in a whole search space, which means that a chaotic result is within a range [0,1];

to ensure that a particle swarm optimization algorithm has a good global exploration capacity in an earlier stage of iteration and is able to converge rapidly in a later stage and maintain mutation randomness of the particles in the whole iteration process, a chaotically decreasing inertia weight is used:

$$w = (w_{init} - w_{end}) \cdot \frac{Maxiter - iter}{iter} + z \cdot w_{end} \qquad (4)$$

wherein, $w_{init}$ and $w_{end}$ are an initial value and an end value of the inertia weight w respectively, Maxiter and iter are a maximum iteration and a current iteration respectively, and z is the chaotic variable and follows formula (3); in this way, the inertia weight is chaotic and maintains an original variation trend.

7. The two-step X-architecture Steiner minimum tree construction method according to claim 1, wherein the new social learning strategy in S13 is specifically as follows:

first, all particles in a current swarm are sorted in an increasing order according to the fitness, and for each particle, particles before the particle forms an example pool of the particle; then, in each iteration, the particle randomly selects a particle from its example pool as a learning object; when the learning object selected by the particle is the first particle in the example pool, the learning object of the particle is an optimal particle in the swarm; next, the particle learns historical optimal experience from the learning object to complete a corresponding social learning behavior; in this process, different particles have different social learning objects; the example pools of the same particle are not always the same in different iterations; so, the particle no longer merely learns from the optimal particle in the swarm, and any better particle in the current swarm may be the learning object of the particle; and this learning process allows the particles to continuously learn from different better individuals during evolution to realize self-improvement to facilitate diversified development of the swarm, which makes it possible to explore a better XST model.

8. The two-step X-architecture Steiner minimum tree construction method according to claim 1, wherein the particle update formula in S13 is specifically as follows:

to enable the particle swarm optimization algorithm to better solve a discretization problem, namely to construct the XSMT, mutation and crossover operators are introduced; the particles follow the following update formula:

$$X_i^t = F_3(F_2(F_1(X_i^{t-1}, w), c_1), c_2) \qquad (5)$$

wherein, w is an inertia weight factor which determines the probability of particle mutation; $c_1$ and $c_2$ are acceleration factors which determine the probabilities of particle crossovers; $F_1$ is a mutation operation and represents an inertia component; $F_2$ and $F_3$ are crossover operations and represent the components of individual cognition and social cognition of the particles respectively; a specific update process is as follows:

the inertia component:

the algorithm completes velocity update of the particles through $F_1$, which is expressed as follows:

$$W_i^t = F_1(X_i^{t-1}, w) = \begin{cases} M(X_i^{t-1}) & r_1 < w \\ X_i^{t-1}, & \text{otherwise} \end{cases} \quad (6)$$

wherein, w determines the probability of the mutation operation of the particles and follows the chaotic decreasing formula (4), and $r_1$ is a random number within [0, 1];

The mutation operation is specifically as follows: a two-point mutation is adopted; if the random number generated meets $r_1 < w$, the particle swarm optimization algorithm selects two edges randomly and changes selections of the two edges; or, if the random number generated meets $r_1 \geq w$, the routing tree remains unchanged;

the individual cognition component:

the algorithm completes individual cognition through $F_2$, which is expressed as follows:

$$S_i^t = F_2(W_i^t, c_1) = \begin{cases} C_p(W_i^t), & r_2 < c_1 \\ W_i^t, & \text{otherwise} \end{cases} \quad (7)$$

wherein, $c_1$ determines the probability that each particle crosses with its individual historical optimum ($X_i^P$), and $r_2$ is a random number within [0, 1]; the individual cognition component reflects a self-experience learning process of the particles;

the social cognition component:

the algorithm completes social cognition of the particles through $F_3$, which is expressed as follows:

$$X_i^t = F_3(S_i^t, c_2) = \begin{cases} C_p(S_i^t), & r_3 < c_2 \\ S_i^t, & \text{otherwise} \end{cases} \quad (8)$$

wherein, $c_2$ determines the probability that each particle crosses with the historical optimum ($X_k^P$) of any particle in the example pool, and $r_3$ is a random number within [0, 1]; the social cognition component reflects information sharing and exchange between the particles;

the crossovers in formulas (7, 8) are as follows: when the random number generated meets $r_2 < c_1$ (or $r_3 < c_2$), the crossover $F_2$ (or $F_3$) is performed, and for a Steiner tree comprising n pins: the particle swarm optimization algorithm randomly generates a continuous interval $[C_{start}, C_{end}]$ in which the crossover is to be performed, and $C_{start}$ and $C_{end}$ are random integers within [1, n−1]; then, a code of a learning object ($X_i^P$ or $X_k^P$) of the particle $X_i$ within an interval $[3 \times C_{start}, 3 \times C_{end}]$ is found; finally, the numeral of the $X_i$ within the interval is replaced by the code of the learning object in the interval; through the crossover, the particle $X_i$ is able to learn part of genes from better particles and approaches a global optimal position gradually by repeated iterative learning; and it is set that the acceleration factor $c_1$ adopts a linearly decreasing strategy and $c_2$ adopts a linearly increasing strategy.

9. The two-step X-architecture Steiner minimum tree construction method according to claim 1, wherein S2 is specifically as follows:

at most q adjacent edges of each pin are traversed through the local topological optimization strategy and are properly adjusted, wherein $1 \leq q \leq Q$, and Q is a maximum degree of pins in the net; meanwhile, the parameter q is adjusted to obtain a better optimization effect or a shorter runtime; the closer q is to Q, the better the optimization effect will be; each pin is endowed with two attributes, one attribute is the degree degree of the pin, which represents the number of adjacent points of the pin, and the other attribute is an adjacent point list adj_list[ ] of the pin, which is used to store the adjacent points; a specific implementation process of this stage is as follows:

SA: recording the degree and adjacent point list of each point in the XST, and for a point with the degree being greater than q, only q adjacent points of this point are recorded;

SB: setting a local topological optimization sequence as follows: from pins with large degrees to pins with small degrees; sorting all the pins in a decreasing order according to the degree, and sorting the adjacent points of each pin in a decreasing order according to the degree, so that topological structures in a dense region are optimized first and then topological structures in a sparse region are optimized;

SC: sequentially optimizing local topological structures of all the points, adjusting PS selections of edges between the pins and the adjacent points, trying to use the other three selections, except the current selection, for connection, and reserving the connection with the minimum fitness; continuously adjusting the PS selections of the q adjacent edges of the pins in the XST to obtain a local optimal structure in a current XST topology; and finally, constructing the X-architecture Steiner tree with the minimum wirelength.

\* \* \* \* \*